(12) United States Patent
Teslenko et al.

(10) Patent No.: US 12,536,794 B2
(45) Date of Patent: Jan. 27, 2026

(54) MOBILE DEVICE, NETWORK NODE AND METHODS FOR IDENTIFYING EQUIPMENT

(71) Applicant: Telefonaktiebolaget LM Ericsson (publ), Stockholm (SE)

(72) Inventors: Maxim Teslenko, Sollentuna (SE); Marios Daoutis, Bromma (SE); Athanasios Karapantelakis, Solna (SE); Konstantinos Vandikas, Solna (SE); Daniel Cederholm, Sollentuna (SE); Aneta Vulgarakis Feljan, Stockholm (SE); Marin Orlic, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 566 days.

(21) Appl. No.: 17/785,221

(22) PCT Filed: Dec. 16, 2019

(86) PCT No.: PCT/SE2019/051284
§ 371 (c)(1),
(2) Date: Jun. 14, 2022

(87) PCT Pub. No.: WO2021/126018
PCT Pub. Date: Jun. 24, 2021

(65) Prior Publication Data
US 2022/0398838 A1 Dec. 15, 2022

(51) Int. Cl.
*G06V 20/10* (2022.01)
*B64U 101/26* (2023.01)
(Continued)

(52) U.S. Cl.
CPC ............ *G06V 20/176* (2022.01); *G06V 20/17* (2022.01); *H04B 17/318* (2015.01);
(Continued)

(58) Field of Classification Search
CPC .... G06V 20/176; G06V 20/17; H04B 17/318; B64U 2101/26; B64U 2101/30;
(Continued)

(56) References Cited

U.S. PATENT DOCUMENTS

| 10,417,755 B1 * | 9/2019 | Wingo | H04W 24/02 |
| 2017/0199646 A1 * | 7/2017 | Priest | H04L 41/145 |

(Continued)

OTHER PUBLICATIONS

Using Unmanned Aircraft Systems for Mobile Network Verifications, by Marjo Heikkila, Marjut Koskela, Tero Kippola, Mahmut Kocak, Juha Erkkila, Jouni Tervonen, 2018 IEEE 29th Annual International Symposium on Personal, Indoor and Mobile Radio Communications (PIMRC) (2018, pp. 805-811) Dec. 18, 2018 (Year: 2018).*

(Continued)

*Primary Examiner* — Jennifer Mehmood
*Assistant Examiner* — Heath E. Wells
(74) *Attorney, Agent, or Firm* — Weisberg I.P. Law, P.A.

(57) ABSTRACT

A method performed by a mobile device for handling identification of equipment. The mobile device records an image, in a recording direction at a first location, of the equipment. Upon recording the image, the mobile device further obtains one or more radiation indications for determining a direction of radiation from the equipment; and provides the obtained one or more radiation indications associated with the recorded image, to an internal identifying process at the mobile device and/or a network node for identifying the equipment.

16 Claims, 9 Drawing Sheets

(51) Int. Cl.
  *B64U 101/30* (2023.01)
  *G06V 20/17* (2022.01)
  *H04B 17/318* (2015.01)
  *H04W 88/08* (2009.01)

(52) U.S. Cl.
  CPC ...... *B64U 2101/26* (2023.01); *B64U 2101/30* (2023.01); *H04W 88/08* (2013.01)

(58) Field of Classification Search
  CPC .............. H04W 88/08; G06T 7/73; G06T 2207/10032; G06T 2207/30164; G06T 2207/30172; G06T 2207/30184; G06T 2207/30252; B64D 47/00; B64C 13/20
  USPC ........................................................ 382/103
  See application file for complete search history.

(56) References Cited

U.S. PATENT DOCUMENTS

| | | | | |
|---|---|---|---|---|
| 2018/0002010 | A1* | 1/2018 | Bauer | G05D 1/689 |
| 2019/0154840 | A1 | 5/2019 | Ferguson et al. | |
| 2020/0226939 | A1* | 7/2020 | Russell | H04W 24/00 |
| 2021/0055746 | A1* | 2/2021 | Jeong | G05D 1/0016 |

OTHER PUBLICATIONS

Supplementary European Search Report dated Aug. 8, 2023 for Patent Application No. 19956994.8, consisting of 7-pages.

M. Schikora et al.; Airborne Emitter Tracking by Fusing Heterogeneous Bearing Data; 17th International Conference on Information Fusion (Fusion); International Society of Information Fusion; Jul. 7, 2014, consisting of 7-pages.

Anonymous; Applying AI to Mobile Radio Site Management; Extract from the Ericsson Mobility Report; Jun. 2019, consisting of 5-pages.

International Search Report and Written Opinion dated Oct. 21, 2020 for International Application No. PCT/SE2019/051284 filed on Dec. 16, 2019, consisting of 12-pages.

T. Y. Yang et al.; A Fast Parallel Algorithm for Thinning Digital Patterns; Communications of the ACM; vol. 27, No. 3; Mar. 1984, consisting of 4-pages.

N. Otsu; A Threshold Selection Method from Gray-Level Histograms; IEEE Transactions on Systems, Man, and Cybernetics, vol. SMC-9, No. 1, Jan. 1979, consisting of 5-pages.

Wikipedia Contributors; Radiation Pattern; Wikipedia; Dec. 12, 2021, consisting of 5-pages.

* cited by examiner

MOBILE DEVICE, NETWORK NODE AND METHODS FOR IDENTIFYING EQUIPMENT

CROSS-REFERENCE TO RELATED APPLICATIONS

This application is a Submission Under 35 U.S.C. § 371 for U.S. National Stage Patent Application of International Application Number: PCT/SE2019/051284, filed Dec. 16, 2019 entitled "MOBILE DEVICE, NETWORK NODE AND METHODS FOR IDENTIFYING EQUIPMENT," the entirety of which is incorporated herein by reference.

TECHNICAL FIELD

Embodiments herein relate to a mobile device, a network node and methods performed therein. In particular, embodiments herein relate to handling identification such as identifying an equipment and/or inspecting a communication installation e.g. an antenna site, in the communications network.

BACKGROUND

In a typical communications network, mobile devices, also known as wireless communication devices, mobile stations, aerial devices, vehicles, stations (STA) and/or wireless devices, communicate with one or another or with a server or similar via a Radio access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node. The radio network node may comprise one or more antennas providing radio coverage over one or more cells. The one or more antennas may be mounted on a radio tower or another structure to enhance the coverage.

Doing inspection of telecom equipment on a radio tower using a climbing crew is an expensive and dangerous task. Today radio towers or other structures are often not owned by operators operating the radio network node. Third party organizations may own and lease space on the structures to multiple operators. Thus, a radio tower may comprise a number of antenna equipment of different operators and for a given operator it becomes a challenge to locate its own equipment on the radio tower from simply visual inspection of the radio tower. In addition, Field Service Operators (FSO) are often facing inconsistencies and discrepancies with respect to what equipment they are expecting to find in a radio site (according to the information registered in their inventory catalog) in relation to the equipment they actually find in the radio site they tasked to service.

Operators might need to pin-point the exact location of their own equipment on top of a structure such as a radio tower. This is due to many reasons e.g.:
  In order to do visual inspection for e.g. plan for repairs or upgrades;
  In order to inventory the equipment mounted at any given time on a radio tower. Routine inventorying of tower-mounted equipment has proven to be a necessity, as in many parts of the world, tower crews are subcontractors and do not sometimes document the work they do on the radio tower, for example, installation of new cabling or new radio equipment such as tower mounted amplifiers (TMA);
  Furthermore, radio tower owners, who lease space to operators, may also be interested in knowing which equipment belong to which tenant. They might use it in order to assess opportunities to optimize space on the tower, assess if there is more space to lease, identify if there are unauthorized installations, etc.

SUMMARY

Mobile devices such as aerial devices e.g. unmanned Aerial Vehicles (UAV) have become increasingly popular in recent years, in particular for surveillance, photography, ground monitoring, spraying pesticides, emergency or rescue operations, and the like. As mobile devices become mainstream with numerous advances in recent years, they become ideal candidates for an increasing number of tasks, including inspection of equipment such as telecom equipment, since their degree of autonomy and capabilities enable performance of dangerous and critical tasks with safety, precision, and yet in a cost effective manner.

Collecting information about equipment e.g. mounted on structures, such as radio towers, is a task that can e.g. be done in an automated way, by allowing a device such as a mobile device e.g. a UAV, to survey a radio site and let it autonomously identify and map the actual equipment pertaining the radio site. However visual-only inspection with a mobile device is a very challenging task in image processing terms, since equipment from different operators may be visually very similar with no distinctive way to differentiate the different equipment visually, and thus without climbing the structure and thorough inspection of cabling it is hard to distinguish the different equipment.

An object of embodiments herein is, therefore, to improve identification of equipment in an efficient manner.

According to an aspect of embodiments herein, the object is achieved by a method performed by a mobile device for handling identification of equipment such as remote radio units, antennas or similar. The mobile device records an image, in a recording direction at a first location, of the equipment, and upon recording the image, the mobile device obtains one or more radiation indications for determining a direction of radiation from the equipment. Furthermore, the mobile device provides the obtained one or more radiation indications associated with the recorded image, to an internal identifying process at the mobile device and/or a network node for identifying the equipment.

According to another aspect of embodiments herein, the object is achieved by a method performed by a network node for identifying an equipment. The network node receives from one or more mobile devices, one or more radiation indications associated with a recorded image of the equipment, which image is recorded in a recording direction at a first location. The network node determines a direction of radiation from the equipment by analysing the received one or more radiation indications. The network node then determines an identity of the equipment based on the recorded image and the determined direction of radiation from the equipment.

According to a further aspect of embodiments herein, the object is achieved by providing a mobile device for handling identification of equipment, e.g. associated with telecommunications such as base station equipment. The mobile device is configured to record an image, in a recording direction at a first location, of the equipment, and to obtain, upon recording the image, one or more radiation indications for determining a direction of radiation from the equipment. The mobile device is further configured to provide the obtained one or more radiation indications associated with the recorded image, to an internal identifying process at the mobile device and/or a network node for identifying the equipment.

According to another aspect of embodiments herein, the object is achieved by providing a network node for identifying an equipment. The network node is configured to receive from one or more mobile devices, one or more radiation indications associated with a recorded image of the equipment, which image is recorded in a recording direction at a first location. The network node is further configured to determine a direction of radiation from the equipment by analysing the received one or more radiation indications; and to determine an identity of the equipment based on the recorded image and the determined direction of radiation from the equipment.

It is furthermore provided herein a computer program product comprising instructions, which, when executed on at least one processor, cause the at least one processor to carry out any of the methods above, as performed by the mobile device or the network node, respectively. It is additionally provided herein a computer-readable storage medium, having stored thereon a computer program product comprising instructions which, when executed on at least one processor, cause the at least one processor to carry out the method according to any of the methods above, as performed by the mobile device or the network node, respectively.

Embodiments herein thus provide a method that locates equipment of e.g. operators based on images acquired by the mobile device by using e.g. visual inspection of the structure. At first, a position of a radiating equipment, i.e. one or more antennas, is identified in the image taken at the mobile device. E.g. when the mobile device circles around a radio tower along with taking pictures the mobile device also scans intensity of radio radiation at e.g. different frequencies. In order to pin point where on pictures is an antenna which radiate at a given frequency, a point of space is identified where energy radiation level is maximum at a given frequency, assuming that the antenna radiates maximum energy in a direction where it is pointing at. Then we continue with processing the image which was taken at the identified point of space. Using image processing in combination with radiation detection an antenna may be detected that is pointing at the mobile device. Then by using one or more image tracking algorithms, information about position of detected antenna may be propagated to other images.

For those operators owning radio tower installations that have more equipment than antennas, for example radio units and TMAs, that do not transmit radio signals, use of image processing, can be used to identify this additional equipment. Embodiments herein allow to automatically detect equipment on a radio structure such as a radio tower and to map it to different owners or mobile operators, and to further distinguish and map to different operators similarly looking equipment on the structure to different operators.

BRIEF DESCRIPTION OF THE DRAWINGS

Examples of embodiments herein are described in more detail with reference to the attached drawings in which.

DETAILED DESCRIPTION

Figure 1:
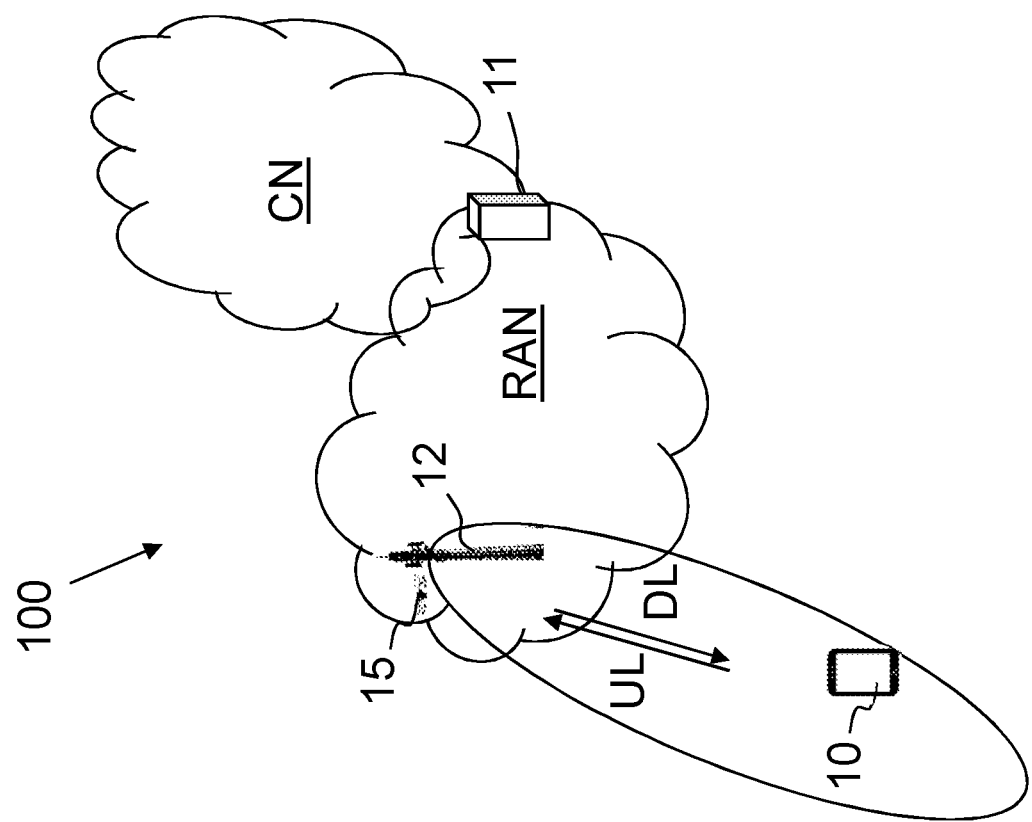
FIG. 1 is a schematic overview depicting an architecture according to embodiments herein.

FIG. 1 is a schematic overview depicting a communications network 100 wherein embodiments herein may be implemented. The communications network 100 comprises one or more Radio Access Networks (RANs) and one or more Core Network (CNs). The communications network 100 may use any technology such as 5G new radio (NR) but may further use a number of other different technologies, such as, long term evolution (LTE), LTE-Advanced, wideband code division multiple access (WCDMA), global system for mobile communications/enhanced data rate for GSM evolution (GSM/EDGE), worldwide interoperability for microwave access (WiMax), or ultra mobile broadband (UMB), just to mention a few possible implementations.

The communications network 100 may comprise one or more radio network nodes 12 providing radio coverage over a respective geographical area by means of antennas or similar. Thus the radio network node 12 may serve a user equipment (UE) 10 such as a mobile phone or similar. The geographical area may be referred to as a cell, a service area, beam or a group of beams. The radio network node 12 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Mobile device to Mobile device (D2D) communication, or any other network unit capable of communicating with a UE within the cell served by the radio network node 12 depending e.g. on the radio access technology and terminology used.

The communications network 100 may further comprise a network node 11 such as a server or application server for collecting and controlling different tasks in the communications network 100.

Figure 4:
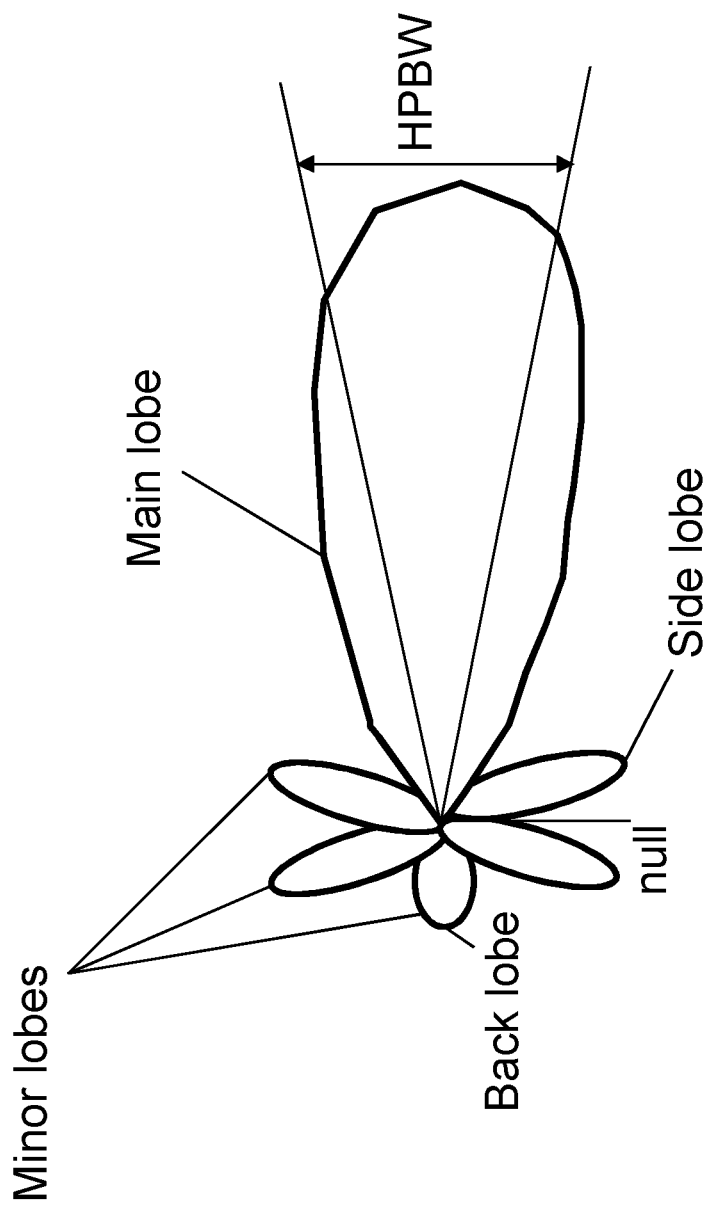
FIG. 4 shows a radiation pattern of an antenna.

A mobile device 15 is configured to be used to identify equipment, such as a radio unit, antenna unit, baseband unit or similar, e.g. mounted on structures such as the radio network node 12 or a radio tower of the radio network node. Other structures may be any type of tower or building with mounted equipment. The mobile device 15 records an image, in a recording direction at a first location, of the equipment. The recording direction may be established from equipment at the mobile device such as visual unit, a positioning system, e.g. a global positioning system unit, and/or a directional unit, e.g. a gyro unit or compass. Upon recording the image, the mobile device 15 obtains one or more radiation indications, e.g. from the equipment, for determining a direction of radiation from the equipment. E.g. the direction of radiation is determined using radiation indications such as signal strength or quality, frequency, or spectral analyzes to separate energy on different channels for separating energy levels emitted by different antennas. In CDMA the channels are separated by orthogonal coding. Without loss of generality in the rest of the description we assume frequency separation of channels, but all proposed methods are applicable for other channel access methods. The mobile device 15 further provides the obtained one or more radiation indications associated with the recorded image, to an internal identifying process at the mobile device and/or a network node 11 for identifying the equipment e.g. to a process performed by the mobile device 15 to identify the equipment. Thus, the mobile device 15 and/or the network node 11 may process the obtained data to identify the equipment. The equipment such as an antenna is radiating more or less in all directions but potentially the direction of radiation may be defined as a direction of maximum power of radiation. The equipment e.g. being a unit with a directional antenna (See FIG. 4). and assuming fixed direction of the beam the direction of maximum power of radiation should be at the direction of center of a main lobe. The mobile device 15 or the network node 11 according to embodiments herein may thus identify the direction of maximum radiation in order to use it for the purpose of identifying direction of radiation for distinguishing the equipment. The direction of radiation may thus be for identifying which equipment in the image is radiating a detected frequency (e.g. in case the image covers a number of equipment). The direction of radiation is relative the identified equipment and thus pointing towards the identified equipment in the image.

Alternatively, the direction of radiation may be defined as the orientation of the whole radiation pattern in space e.g. to identify the orientation we can find the best match of the whole recorded radiation map with theoretical antenna's radiation pattern. To describe an orientation of radiation, we can choose it to be associated with any predetermined point on the radiation pattern. If as such point we would choose the center of the main lobe then the presented two definitions of direction would reference the same direction.

Embodiments herein allow locating operator's equipment on images acquired by the mobile device 15 from visual inspection of the structure and also determining direction based on radiation.

Figure 2:
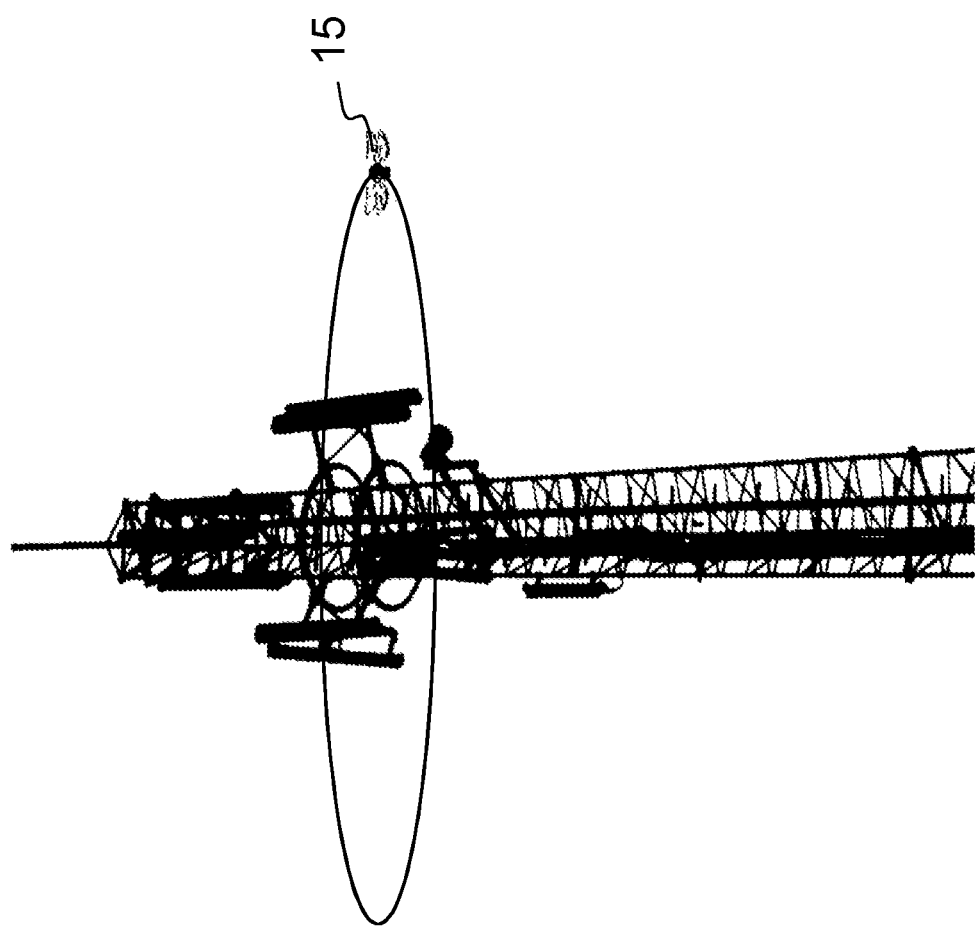
FIG. 2 is a schematic overview depicting a solution according to embodiments herein.

FIG. 2 is a schematic overview depicting the mobile device 15 inspecting equipment e.g. mounted on a radio tower according to embodiments herein. At first, position of radiating equipment, i.e. antennas are identified on a recorded picture. When the mobile device 15 circles around a tower along with taking pictures it also scans energy intensity of radio radiation at different frequencies. In order to pin point where on pictures is e.g. an antenna which radiate at a given frequency, a point of space, that is the first location, is identified where energy radiation level is maximum at a given frequency, assuming that antenna radiates maximum energy in direction where it is pointing at. Then the image is processed for identifying equipment in the image, wherein the image is recorded or taken at the identified point of space. Using image processing the equipment is detected that is radiating in the direction pointing at the mobile device 15. Then using image tracking algorithms, we can propagate information about position of detected equipment to other images.

For those operators owning radio tower installations that have more equipment than antennas (for example radio units and TMAs) that do not transmit radio signals, use of image processing, can be used to identify this additional equipment.

Figure 3:
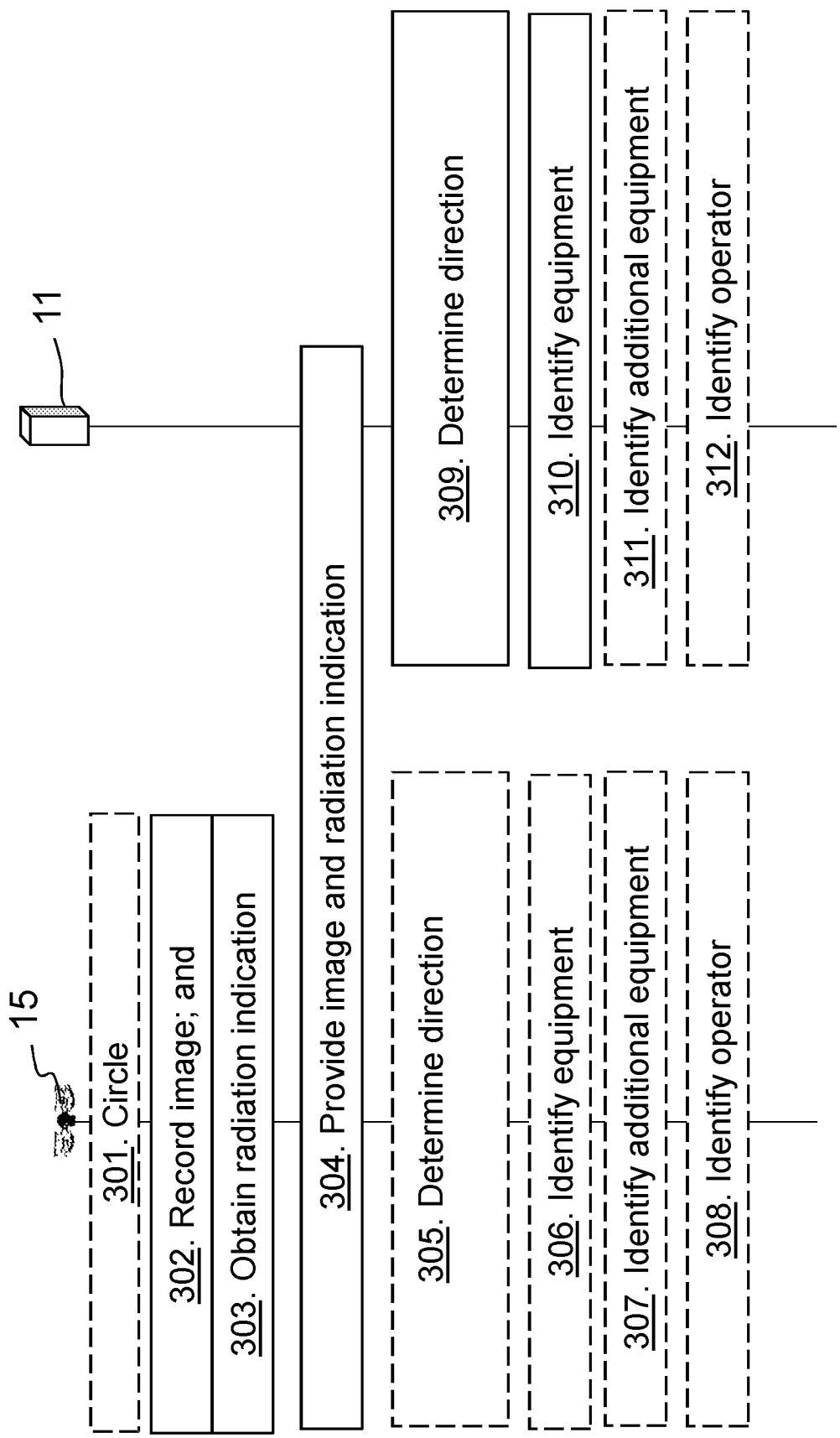
FIG. 3 is a combined signalling scheme and flowchart according to embodiments herein.

Example embodiments of a method performed by the mobile device 15 for handling identification of equipment e.g. inspecting a radio structure will now be described with reference to a flowchart depicted in FIG. 3. The mobile device 15 may be represented by any mobile agent such as e.g. an aerial vehicle and/or an unmanned vehicle. The equipment may be any equipment such as equipment associated with telecommunications or any equipment radiating radio signals or similar. The method comprises the following actions, which actions may be taken in any suitable order. Actions that are optional are presented in dashed boxes in FIG. 3.

Action 301. The mobile device 15 may circle around the structure. Thus, the mobile device 15 may fly in circles at different altitudes around the structure. The horizontal distance to the antennas should be kept quite constant during initial measurements since the received power depends on the distance. Note that some distance should be kept to the antennas since the radio propagation might be impacted if the drone flies in the so called near-field and the performance might also be impacted negatively by effects such as Passive Intermodulation (PIM). PIM may create interference that will reduce a cell's receive sensitivity or even block calls. This interference can affect both the cell that creates it, as well as other nearby receivers.

Action 302. The mobile device 15 records an image, in the recording direction at the first location, of the equipment. The recording direction is in relation to the first location of the mobile device 15. E.g. the recording direction is pointing in a direction relative the present coordinates of a position of the mobile device 15.

Action 303. Upon recording the image, the mobile device 15 obtains one or more radiation indications for determining the direction of radiation from the equipment. The direction of radiation is in relation to the first location of the mobile device 15. E.g. the direction of radiation is pointing in a direction relative and away from the present coordinates of a position of the mobile device 15. The one or more radiation indications may comprise one or more measured signal strengths, signal qualities, and/or frequencies of one or more beams or signals from the equipment e.g. mounted on the structure. The mobile device 15 may select one measured signal strength, signal quality, and/or frequency out of the one or more measured signal strengths, signal qualities, and/or frequencies based on level measured signal strengths, and/or signal qualities, to be used to determine the direction of radiation. The mobile device 15 may obtain the one or more radiation indications by measuring the radiation and/or receiving the one or more radiation indications from another device such as a second mobile device or the user equipment 10. E.g. along with every picture taken the radio wave energy level is recorded across all spectrum bands by the mobile device 15. The pictures with radio energy signatures i.e. recorded radio wave energy levels are taken continuously as the mobile device 15 is circling to create a radio energy signature map. The radio energy signature map may represent energy measurements and/or images at points on a cylinder around the tower. The recording direction may be relative the direction of radiation hence the direction of radiation may correspond to a position in the recorded image.

Action 304. The mobile device 15 provides the obtained one or more radiation indications associated with the recorded image, to the internal identifying process at the mobile device and/or the network node 11 for identifying the equipment.

Action 305. In embodiments wherein the obtained one or more radiation indications associated with the recorded image are provided to the internal identifying process, the internal identifying process may be performed at the mobile device 15. The internal identifying process may comprise that the mobile device 15 may determine the direction of radiation from the equipment by analysing the obtained one or more radiation indications.

Action 306. Furthermore, the mobile device 15 may then determine an identity, such as serial number or an ID connected to an operator, of the equipment based on the recorded image and the determined direction of radiation from the equipment. Identification may be performed using image processing e.g. a machine learned model using recording directions as well as direction of radiation as inputs and identity as output. It should be noted that intensities of radiation in the direction of radiation and/or opposite the recording direction may additionally be used to identify the equipment. A combination of the image and radiation with a known network inventory and operational status of equipment may additionally be used to determine identity. The mobile device 15 may create a map of measurements around the tower and use some kind of machine learning, such as using neural networks, to map the measurements with the most likely direction of radiation to determine identity in the recorded image.

Action 307. Furthermore, the mobile device 15 may further identify an additional equipment connected to the identified equipment by tracking, using image processing, a cable connected to the identified equipment in the recorded image.

Action 308. Additionally, the mobile device 15 may identify a vendor, an operator, a manufacturer, and/or an owner of the equipment and/or the additional equipment based on the determined identity of the equipment.

Action 309. Alternatively or additionally to the embodiments of identifying the equipment locally at the mobile device 15, this may be performed at the network node 11. Thus, the network node 11 may determine the direction of radiation from the equipment by analysing the received one or more radiation indications.

Action 310. Furthermore, the network node 11 may determine the identity of the equipment based on the recorded image and the determined direction of radiation from the equipment. The network node may create a map of measurements around the tower and use some kind of neural networks to map the measurements to most likely direction of radiation to determine identity in the recorded image.

Action 311. The network node 11 may further identify the additional equipment connected to the identified equipment by tracking, using image processing, the cable connected to the identified equipment in the recorded image.

Action 312. The network node 11 may also identify the vendor, the operator and/or the owner of the equipment and/or the additional equipment based on the determined identity of the equipment.

The actions in the network node 11 may be to confirm result of the mobile device 10, build a machine learning process to identify equipment, and/or to alternatively identify the equipment at the network node 11 instead of the mobile device 15.

Embodiments herein allow to automatically detect equipment e.g. on a tower and may map it to different operators, such as mobile tele operators, thus allow to distinguish and map to different operators similarly looking equipment on the structure.

Embodiments herein such as those mentioned above will now be further described and exemplified. The text below is applicable to and may be combined with any suitable embodiment described above.

When locating equipment radiating radio signals such as antennas the following two properties of antenna radiation may be used:
   antennas radiate at different frequencies. It is due to different mobile operators owning different part of spectrum. Furthermore, in order to prevent interference among equipment of the same operator different sectors around a tower may operate at different frequencies.
   directional antennas, used e.g. at radio towers, may have spatial non-uniform pattern of radiation (radiate differently in different directions), see FIG. 4.

Embodiments herein disclose the mobile device 15 acquiring images, which mobile device 15, besides comprising a camera, may also have a radiation receiver, e.g. a wideband radio receiver, that assesses e.g. level of received radio wave energy at different frequency bands corresponding to the emitting frequencies of radiating antennas.

Since the mobile device 15 is going to fly close to the equipment mounted on the structure its receiver should be able to cope with high energy level of radio signals emitted by the equipment. Thus the radiation receiver may need to be designed for high power reception or an additional attenuation circuit may be used between the antenna and the radiation receiver to avoid receiver clipping.

The radiation receiver at the mobile device 15 may be an antenna that may either have omnidirectional or directional radiation pattern (because of reciprocity the receiving pattern is identical to the transmitted radiation). The latter is preferable since it would allow better to distinguish neighbouring antennas. When directional antenna is used the direction of its maximum gain should have known relationship with the direction of where the camera of the mobile device 15 is pointing (in the simplest implementation it should coincide with the middle of the image). By using several receive antennas on the mobile device 15 it is also possible to use receive beamforming to get a narrow beam that even could be steered towards the tower antenna of interest. It should be noted though that this would severely increase the complexity (and thus cost) as well as power consumption of the receiver equipment of the mobile device 15.

Another parameter to keep in mind is that antennas typically are optimized for a certain frequency range. If it is known that the tower is equipped with antennas covering very different frequency ranges, e.g. low-band and mmW bands, the mobile device 15 might have to use different receive antennas to be able to properly detect signals from different frequency bands. The radiation receiver might also support a limited frequency range so in some scenarios it might also be required to use multiple radiation receivers at the mobile device 15.

Once the mobile device 15 may have established or created a map such as a whole radio energy signature map of a site each frequency band may be associated with an antenna which radiate it. To do that for a given frequency a point on the radio energy signature map is identified where a value of energy is maximum for that frequency. Let's call such a point $p_f$. Then on the acquired image corresponding to the $p_f$ antennas are detected which are pointing at the mobile device 15. If that equipment is unique the equipment is identified otherwise a tie breaking process is applied to determine which equipment is radiating what.

The tie breaking process may comprise that when more than one equipment is detected to be directed at $p_f$, then the mobile device 15 may be instructed to fly to the $p_f$.

In case the mobile device 15 comprises an omnidirectional antenna, the mobile device 15 may be instructed for each equipment in question to fly towards the equipment from the first point $p_f$. The equipment for which energy level is increasing most rapidly is considered a winner of the tie breaking process and selected as the identified equipment. In the far-field region of the equipment such as antennas the power should, in a free space Line of Sight (LOS) scenario, increase proportionally to the quadratic reverse of the distance to the equipment. In the near-field the propagation is more complex and if possible it should be avoided to fly in the near-field since the results will be more difficult to interpret and there is also a risk that the mobile device 15 may influence the propagation.

In case a directional antenna is comprised on the mobile device 15, then the mobile device 15 can simply point the center of its camera and hence the maximum gain of its receiving antenna towards the equipment in question and then the equipment which would produce maximum reading be considered the winner of the tie breaking process. This will of course require that the directivity is narrow enough to be able to separate the antennas. An alternative to a directional antenna is to have several antennas on the mobile device 15 and use receive beamforming to point the beam at each antenna.

The method described above would work only when the antenna is radiating signals of constant power. Otherwise, because the mobile device 15 is taking measurements at different time for different points in space the resulting signature map would be a product of the radiation pattern and the function of temporal antenna's power variation. Typically, the transmission power may vary over time in a mobile system, e.g. depending on the cell load, i.e. the data amount to be sent to User Equipment (UEs) served by radio network nodes. There are also energy savings methods such as lean carriers that reduce signaling when it is not needed that will affect the transmitted power.

For example, antenna might radiate only at 50% of its maximum power when the mobile device 15 is located at the first location $p_f$, that means the mobile device 15 would measure 50% of maximum possible power for that antenna. When the mobile device 15 re-locate to a point where antenna has 75% of its maximum gain the antenna might radiate at full power. Measured energy level at the second point will be 75% of maximum possible power. In that case maximum measured power would erroneously be at the second point rather than at the first point $p_f$. To cope with the problem, it is herein described two solutions.

Solution Using One Mobile Device 15:

In order to deal with temporal variation of the signal the mobile device 15 may hover in spatially adjacent waypoints for a while and do multiple measurements. If a simple spectrum analyzer type of receiver is used at the mobile device 15 the measurements may be averaged over several radio frames to get a typical radio value. Another option is to use the peak value of the measurement but true peak power will only be reached for full cell load so there is a risk that this will vary over quite long time intervals. If a more complex radio receiver is used it is possible to measure the power of a specific signal of the radio standard, such as the synchronization signals. The power of these signals doesn't vary over time, when being active, so then the power measurement will not vary with e.g. the cell load. When the selected measurement has been performed the value is recorded for the point in signature map.

Solution Using the Mobile Device 15 and Simultaneously Another Radio Energy Measuring Device:

To mitigate shortcomings of previous solution where the mobile device 15 potentially must hover in each point, i.e. location, for a prolonged period of time. It is herein proposed to use a second radio energy measuring device located at a fixed location. This second radio energy measuring device, also referred to herein as another device, may be another mobile device 15 hovering at a fixed location or any other device located on the ground or in the air.

Because of fixed location the second radio energy measuring device will be at a constant gain of the antenna radiation pattern. Thus, the signal level measured at the second radio energy measuring device may be modulated only by output power of antenna. Now the values measured at the first device (the mobile device 15) may be divided by values measured at the second radio energy measuring device taken at the same time. This way temporal dependencies due to antenna power variation measured at the first device are mitigated. Note though that the devices are synchronized to be able to do a direct division between the measurement results. In an unsynchronized scenario it could be possible to do an off-line synchronization by e.g. using correlation methods but then the second radio energy measuring device may be able to record the data for all points in time (will results in huge measurement files).

Another issue may be antennas with beamforming capabilities that do not have fixed-in-space radiation pattern. The radiated beams direct its maximum gain towards the position of UE(s), such as mobile phones. As UEs move the direction of the maximum gain moves as well. Depending on the type of beamforming used there might be one beam active at a time (typical for analog beamforming) or there might be several beams active simultaneously (possible with digital beamforming).

Solution Using One Mobile Device 15:

A beamforming radio may need to transmit synchronization signals so that UEs not attached to the radio can discover the beamforming radio. Exactly how to do this is specific for each radio/baseband type. In case of analog beamforming a grid of beams may typically be used and then the synchronization signals are typically swept over the different beams one at a time (in its specific point of the radio frame). With digital beamforming it is possible to send the synchronization signals in several beams at a time and in some products multiple beams are used to create one wider beam so that the position of the UE is not so sensitive.

If the receiver on the mobile device 15 is capable of distinguishing the synchronization signals it can use those for the power measurements. By positioning the mobile device 15 right in front of the equipment the mobile device 15 may then wait until a beam with the synchronization signals is pointing towards the mobile device 15 and then measure the power level of that. With knowledge of the beamforming method used it might be possible to position the mobile device 15 in a more optimal way for each specific method.

Solution Using a UE Along with the Mobile Device 15:

Another possibility is to use a fixed-position UE as a second device or the other device that works in collaboration with the mobile device 15. The fixed-position UE connects to the mobile network of interest. This way the UE may attract and fix on itself a beam of one of the equipments. After UE attachment the mobile device 15 may create a signature map exactly as described above in previous embodiments. Though now when the first location $p_f$ is identified we are not looking at the middle of taken at $p_f$ image, but we derive the direction where we should look on the image using the following consideration.

Both the location of UE and the mobile device 15 at $p_f$ are in the middle of the beam, i.e. at the maximum gain of the antenna. If we draw imaginary line over the two points, then the antenna will be located on that line. Assume that the mobile device 15 is between the equipment and the UE. So, the equipment with respect to the mobile device 15 is exactly in an opposite direction of location of the UE when the mobile device 15 is in the first location such as $p_f$ location.

To mark position of the UE to the mobile device 15 any form of precise positioning system could be used. For example, the UE may emit distinctive light which would allow the mobile device 15 to distinguish it from background.

Figure 5:
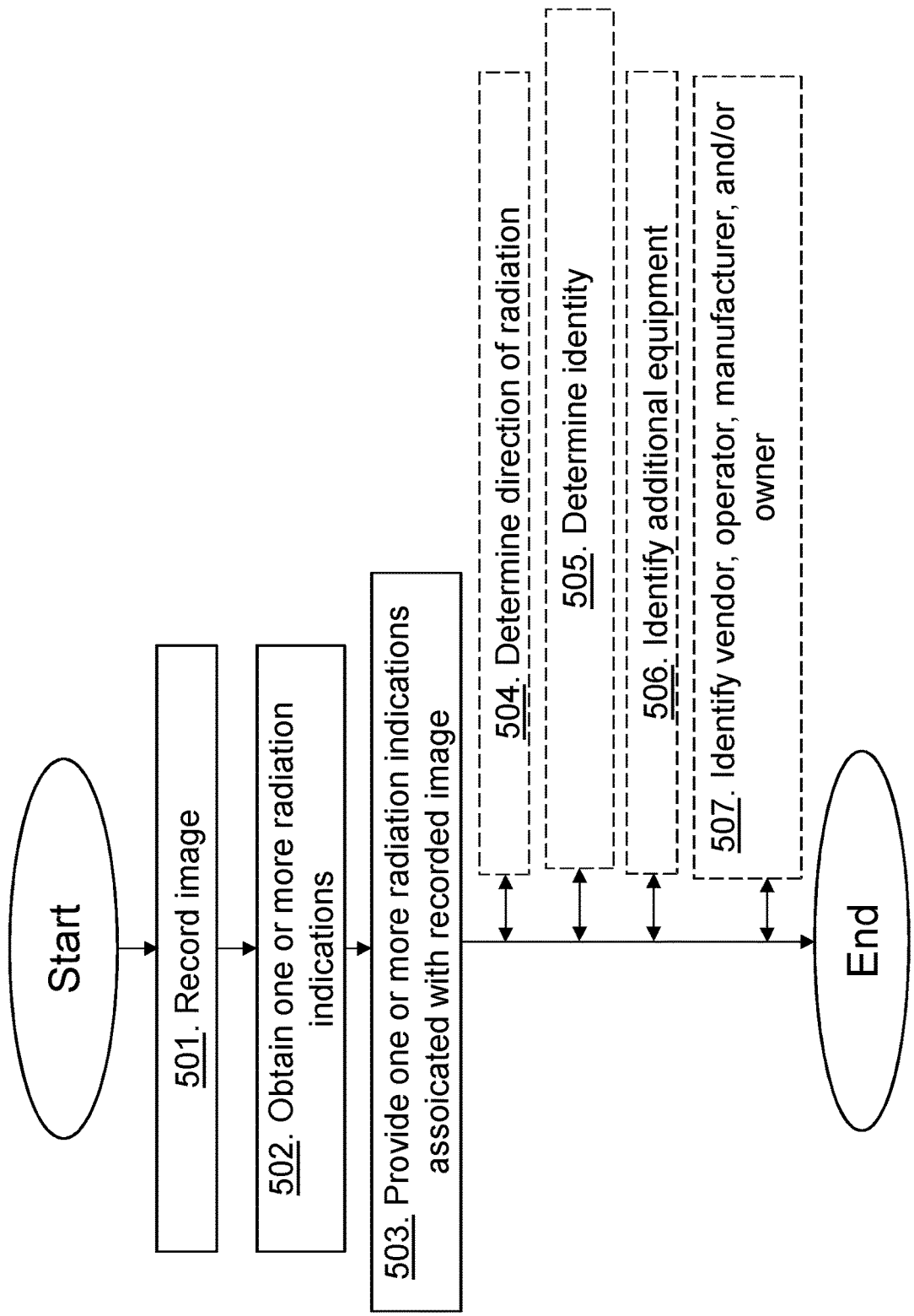
FIG. 5 is a schematic flowchart depicting a method performed by a mobile device according to embodiments herein.

The method actions performed by the mobile device 15 for handling identification such as enabling identification or performing the identification, of the equipment according to embodiments will now be described with reference to a flowchart depicted in FIG. 5. The actions do not have to be taken in the order stated below, but may be taken in any suitable order. Actions performed in some embodiments are marked with dashed boxes.

Action 501. The mobile device 15 records the image, in the recording direction at the first location, of the equipment.

Action 502. The mobile device 15 obtains, upon recording the image, one or more radiation indications for determining a direction of radiation from the equipment. The one or more radiation indications may comprise one or more measured signal strengths, signal qualities, and/or frequencies of one or more beams or signals from the equipment. The mobile device 15 may select one measured signal strength, signal quality, and/or frequency out of the one or more measured signal strengths, signal qualities, and/or frequencies based on level measured signal strengths, and/or signal qualities. The mobile device 15 may receive the one or more radiation indications and/or other radiation indications from the other device e.g. the UE 10.

Action 503. The mobile device 15 provides the obtained one or more radiation indications associated with (or mapped to) the recorded image, to the internal identifying process at the mobile device and/or the network node 11 for identifying the equipment.

Action 504. The mobile device 15 may, when the obtained one or more radiation indications associated with the recorded image are provided to the internal identifying process, determine the direction of radiation from the equipment by analysing the obtained one or more radiation indications. The analysing the obtained one or more radiation indications may comprise determining a maximum measured signal strength and/or signal quality, and/or determining angle of arrival and/or a frequency of one or more beams or signals from the equipment and based on the determined maximum measured signal strength and/or signal quality, angle of arrival and/or frequency determine the direction of radiation.

Action 505. The mobile device 15 may further, when the obtained one or more radiation indications associated with the recorded image are provided to the internal identifying process, determine the identity of the equipment based on the recorded image and the determined direction of radiation from the equipment. Image processing may be used to determine the identity of the equipment. It should be noted that intensities of radiation in the direction of radiation and/or opposite the recording direction may additionally be used to identify the equipment. A combination of the image and radiation with a known network inventory and operational status of equipment may additionally be used to determine identity. E.g. knowing the carrier frequencies (or other 'signal qualities') for antenna sectors may be needed to map the energy signature to antennas for more complex sites.

Figure 7:
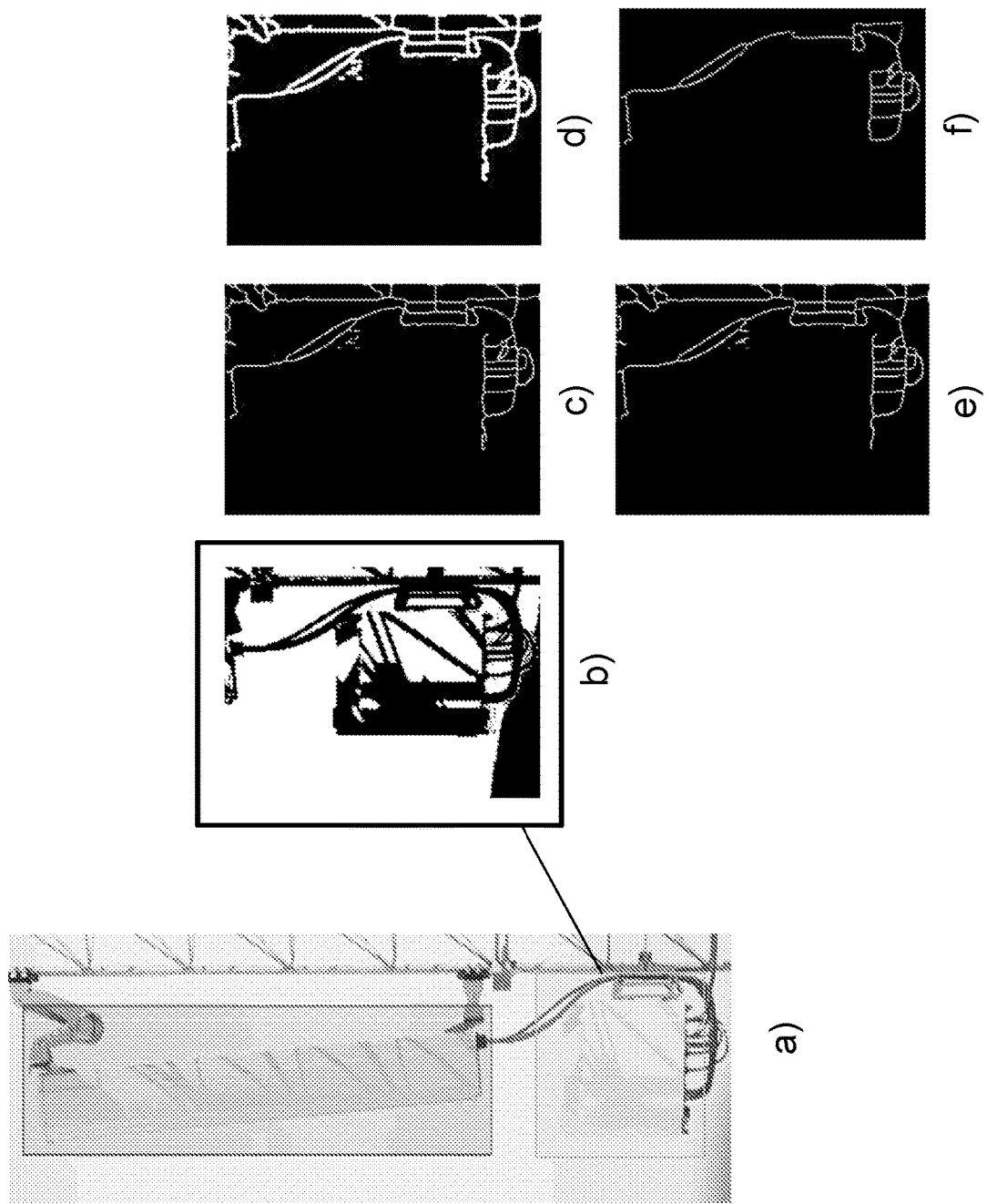
FIG. 7 is a schematic overview depicting a manner of identifying additional equipment connected to identified equipment.

Action 506. The mobile device 15 may in addition identify the additional equipment connected to the identified equipment by tracking, using image processing, a cable connected to the identified equipment in the recorded image see FIG. 7 below.

Action 507. The mobile device 15 may identify the vendor, the operator, the manufacturer, and/or the owner of the equipment and/or the additional equipment based on the determined identity of the equipment.

Figure 6:
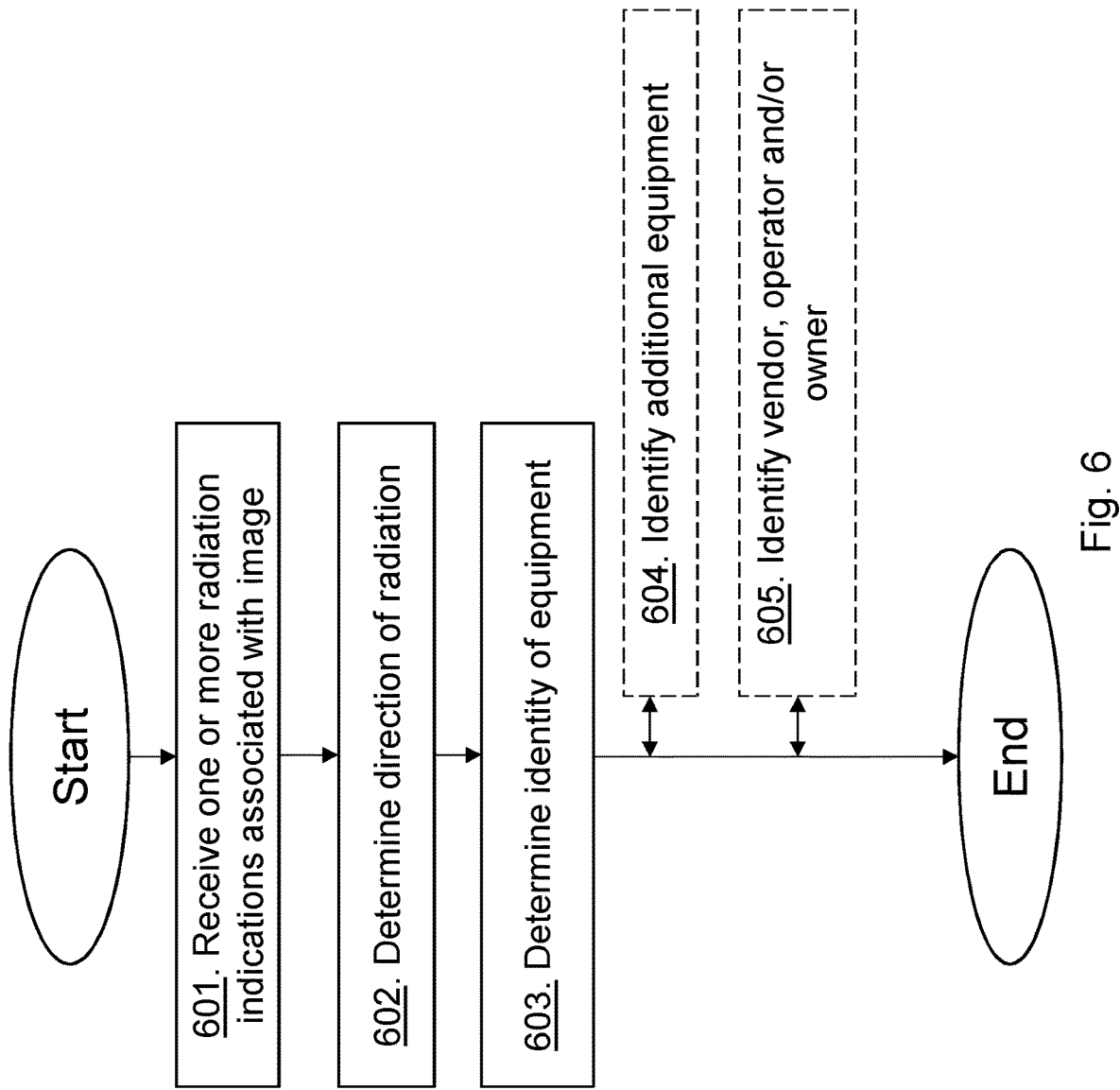
FIG. 6 is a schematic flowchart depicting a method performed by a network node according to embodiments herein.

The method actions performed by the network node 11 for identifying the equipment according to embodiments will now be described with reference to a flowchart depicted in FIG. 6. The actions do not have to be taken in the order stated below, but may be taken in any suitable order. Actions performed in some embodiments are marked with dashed boxes.

Action 601. The network node 11 receives, from one or more mobile devices 15, the one or more radiation indications associated with the recorded image of the equipment, which image is recorded in the recording direction at the first location. The one or more radiation indications may comprise one or more measured signal strengths, signal qualities, and/or frequencies of one or more beams or signals from the equipment. Another radiation indication may be received from another device.

Action 602. The network node 11 determines the direction of radiation from the equipment by analysing the received one or more radiation indications. The network node 11 may select one measured signal strength, signal quality, and/or frequency out of the one or more measured signal strengths, signal qualities, and/or frequencies based on level measured signal strengths, and/or signal qualities. The analysing the received one or more radiation indications may comprise determining the maximum measured signal strength and/or signal quality, and/or determining angle of arrival and/or a frequency of one or more beams or signals from the equipment and based on the determined maximum measured signal strength and/or signal quality, angle of arrival and/or frequency determine the direction of radiation.

Action 603. The network node 11 determines the identity of the equipment based on the recorded image and the determined direction of radiation from the equipment. Image processing may be used to determine the identity of the equipment. It should be noted that intensities of radiation in the direction of radiation and/or opposite the recording direction may additionally be used to identify the equipment.

Action 604. The network node 11 may identify the additional equipment connected to the identified equipment by tracking, using image processing, the cable connected to the identified equipment in the recorded image.

Action 605. The network node 11 may identify the vendor, the operator and/or the owner of the equipment and/or the additional equipment based on the determined identity of the equipment.

As mentioned above, a tower may include equipment that does not transmit radio signals. However, this additional equipment may always be connected to an equipment radiating signals e.g. via coaxial cables. Therefore, it is possible to identify which operator owns which equipment, by using a method to track the cable as it starts from the equipment, potentially passes through a TMA and ends up in a Remote Radio Unit (RRU). In the literature, there are many methods for wire or cable segmentation. One of these potential approaches, using image processing, could be:

- Designate a Place of Interest (POI) in the image. The POI is a rectangle that can be designated as follows: bottom of the leftmost, topmost detected component (RRU or TMA or antenna) in the frame minus a margin (e.g. a number of pixels) to bottom of rightmost detected component plus a margin. The next of the steps work in this POI (see FIG. 7*a* for complete image and FIG. 7*b* for POI extraction).
- If image is in color (e.g. 3-channel RGB), convert image to grayscale (1 channel, meaning 1 integer value per pixel), easier to work on and some of the algorithms mentioned in next steps actually require it.
- Subsequently, the image gets thresholded, meaning it's converted to a binary format (black and white). One approach to thresholding would be to use Nobuki Otsu's method, see Nobuyuki Otsu (1979). "A threshold selection method from gray-level histograms". IEEE Trans. Sys., Man., Cyber. 9 (1): 62-66.
- Subsequently, a thinning algorithm may be applied, e.g. the Zhang-Shueng thinning algorithm, see T. Y. Zhang and C. Y. Suen. 1984. A fast parallel algorithm for thinning digital patterns. Commun. ACM 27, 3 (March 1984), 236-239. We get a 1-pixel length of the skeleton of the image, allowing us to extract shapes. The cables are generally black against white background so there is a very high change they will show up in the image. FIG. 7*c* shows results of image in FIG. 7*b*, after thresholding and skeletonization is applied.
- In case some of the cables are incomplete (e.g. due some reflection in part of the cable in the original image causing the thresholding to classify it incorrectly, therefore showing as "black" in FIG. 7*c*, it is possible to do some dilation (expansion of the shapes in an image)—see FIG. 7*d*. Subsequently, the same thinning algorithm (without thresholding) is applied, see FIG. 7*e*.
- Now is the time to iterate through the detected shapes and identify whether they start AND end in bounding boxes. The process of identification is as follows:
  - Start by detecting which shapes are candidate cables: such shapes always start within or very near a detected component, as a cable is always connected to an RRU, antenna or TMA. To visualize this, a candidate cable will feature white pixels that do not reach the side of the component. A sliding window can be used within and around the bounding box of the component to check for the aforementioned. All other shapes starting outside of the detected component area are not considered candidate cables.
  - For every candidate cable, start iterating through the white pixels in a loop. The principle here being that there must be a "white pixel" in one of the 8 neighboring positions (top-left, top, top-right, right, bottom-right, bottom, bottom-left, left).
  - If there is no white pixel in one of the neighboring positions in the iteration, then the cable ends.
    - If the ending position is in or around the detected component, then it's a cable that connect two components, meaning that we classify this cable as a "true positive".
    - If the ending position is not in or around the detected component, then we disqualify the candidate cable. The same holds true for cables that end at the edge of the POI image we are working with.
  - FIG. 7*f* shows which shapes are considered as "true positive" candidate cables. For all "true positive" occurrences, create a list of which components are connected (e.g. RRU1-TMA1, TMA1-Antenna, RRU2-Antenna).
  - The last step of the identification process iterates through the list and from the antenna, it outputs which components are connected, e.g.: Antenna {RRU1, TMA1, RRU2}.

Figure 8:
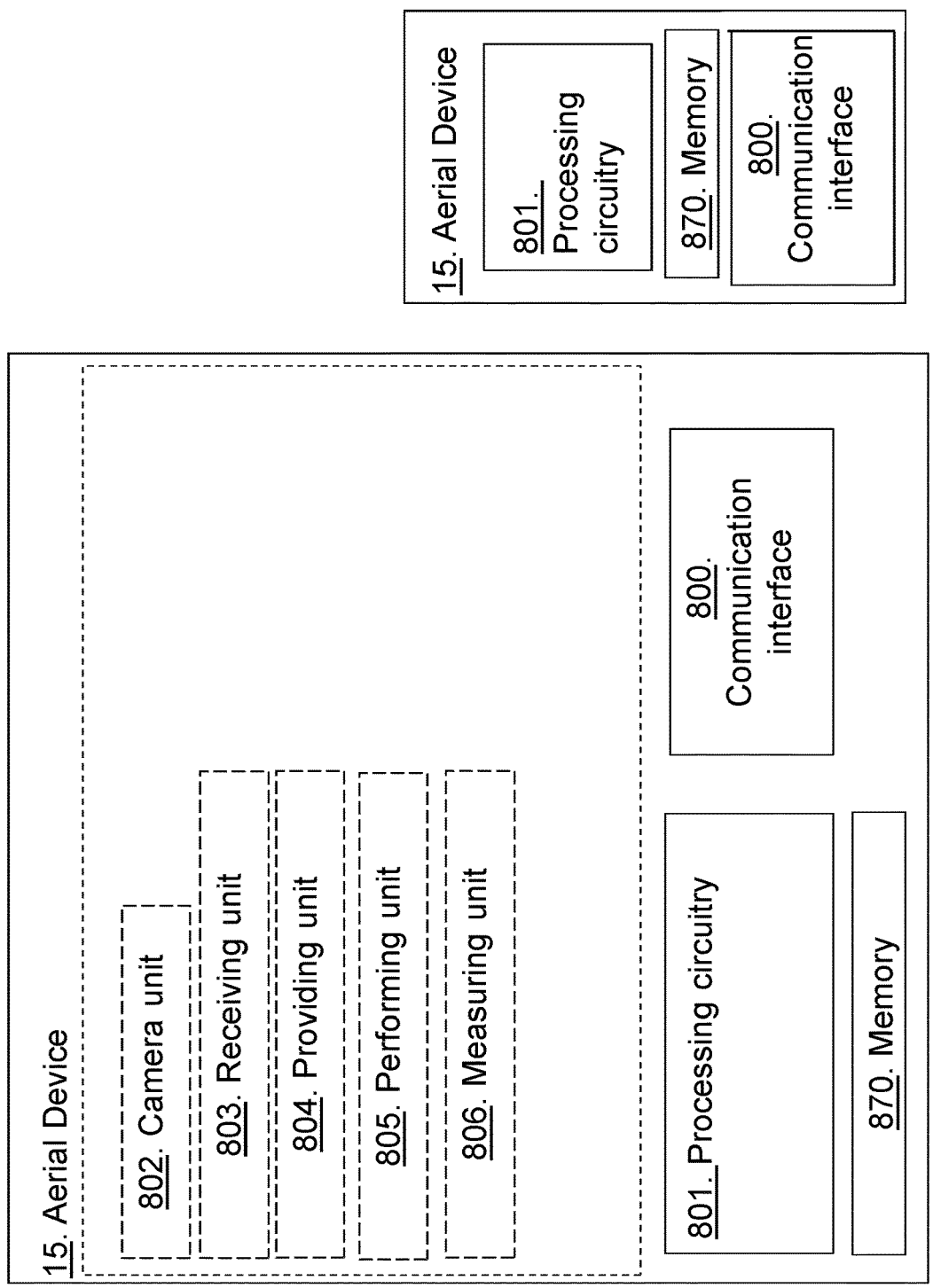
FIG. 8 is a block diagram depicting a mobile device according to embodiments herein.

To perform the method actions mentioned above for handling identification of the equipment, e.g. associated with telecommunications such as radio equipment, the mobile device 15 may comprise an arrangement depicted in two embodiments in FIG. 8. The equipment may be mounted on a structure such as a radio tower.

The mobile device 15 may comprise a communication interface 800 depicted in FIG. 8, configured to communicate e.g. with the communications network 100 also referred to as a cloud network. The communication interface 800 may comprise a wireless receiver (not shown) and a wireless transmitter (not shown) and e.g. one or more antennas. The embodiments herein may be implemented through a processing circuitry 801 configured to perform the methods herein. The processing circuitry may comprise one or more processors. Thus, it is herein provided the mobile device e.g. comprising processing circuitry and memory, said memory comprising instructions executable by said processing circuitry whereby said mobile device 15 is operative to perform the methods herein.

The mobile device 15 may comprise a camera unit 802. The processing circuitry 801, the mobile device 15 and/or the camera unit 802 is configured to record the image, in the recording direction at the first location, of the equipment.

The mobile device 15 may comprise a receiving unit 803, e.g. a receiver or a transceiver with one or more antennas. The processing circuitry 801, the mobile device 15 and/or the receiving unit 803 is configured to, upon recording the image, obtain the one or more radiation indications for determining the direction of radiation from the equipment. The one or more radiation indications may comprise one or more measured signal strengths, signal qualities, and/or frequencies of one or more beams or signals from the equipment. The processing circuitry 801, the mobile device 15 and/or the receiving unit 803 may be configured to obtain the one or more radiation indications by receiving the one or more radiation indications from another device such as a UE or another mobile device.

The mobile device 15 may comprise a providing unit 804, e.g. a transmitter or a transceiver with one or more antennas. The processing circuitry 801, the mobile device 15 and/or the providing unit 804 is configured to provide the obtained one or more radiation indications associated with the recorded image, to the internal identifying process at the mobile device and/or the network node 11 for identifying the equipment.

The mobile device 15 may comprise a performing unit 805, e.g. a processor or processing part. The processing circuitry 801, the mobile device 15 and/or the performing unit 805 may be configured, wherein the mobile device 15 is configured to provide the obtained one or more radiation indications associated with the recorded image, to the internal identifying process, to perform the internal identifying process by: determining the direction of radiation from the equipment by analysing the obtained one or more radiation indications; and determining an identity of the equipment based on the recorded image and the determined direction of radiation from the equipment. The analysing the obtained one or more radiation indications may comprise determining a maximum measured signal strength and/or signal quality, and/or determining angle of arrival and/or a frequency of one or more beams or signals from the equipment, and the processing circuitry 801, the mobile device 15 and/or the performing unit 805 may then be configured to determine configured to determine the direction of radiation based on the determined maximum measured signal strength and/or signal quality, angle of arrival and/or frequency. Image processing may be used to determine the identity of the equipment. The processing circuitry 801, the mobile device 15 and/or the performing unit 805 may be configured to identify the vendor, the operator, the manufacturer, and/or the owner of the equipment and/or the additional equipment based on the determined identity of the equipment. The processing circuitry 801, the mobile device 15 and/or the performing unit 805 may be configured to identify the additional equipment connected to the identified equipment by tracking, using image processing, the cable connected to the identified equipment in the recorded image.

The mobile device 15 may comprise a measuring unit 806. The processing circuitry 801, the mobile device 15 and/or the measuring unit 806 may be configured to measure or detect radiation from the direction relative the mobile device 15.

The embodiments herein may be implemented through a respective processor or one or more processors, such as a processor of the processing circuitry 801 in the mobile device 15 depicted in FIG. 8, together with a respective computer program code for performing the functions and actions of the embodiments herein. The program code mentioned above may also be provided as a computer program product, for instance in the form of a data carrier carrying computer program code for performing the embodiments herein when being loaded into the mobile device 15. One such carrier may be in the form of a universal serial bus (USB) stick, a disc or similar. It is however feasible with other data carriers such as any memory stick. The computer program code may furthermore be provided as pure program code on a server and downloaded to the mobile device 15.

The mobile device 15 may further comprise a memory 870 comprising one or more memory units to store data on. The memory comprises instructions executable by the processor. The memory 870 is arranged to be used to store e.g. measurements, photos, location information, meta data, instructions, configurations and applications to perform the methods herein when being executed in the mobile device 15.

Those skilled in the art will also appreciate that the units in the mobile device 15 mentioned above may refer to a combination of analogue and digital circuits, and/or one or more processors configured with software and/or firmware, e.g. stored in the mobile device 15, that when executed by the respective one or more processors perform the methods described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 890 comprises instructions, which when executed by the respective at least one processor, cause the at least one processor of the mobile device 15 to perform the actions above.

In some embodiments, a carrier 880 comprises the computer program 890, wherein the carrier 880 is one of an electronic signal, an optical signal, an electromagnetic signal, a magnetic signal, an electric signal, a radio signal, a microwave signal, or a computer-readable storage medium.

Figure 9:
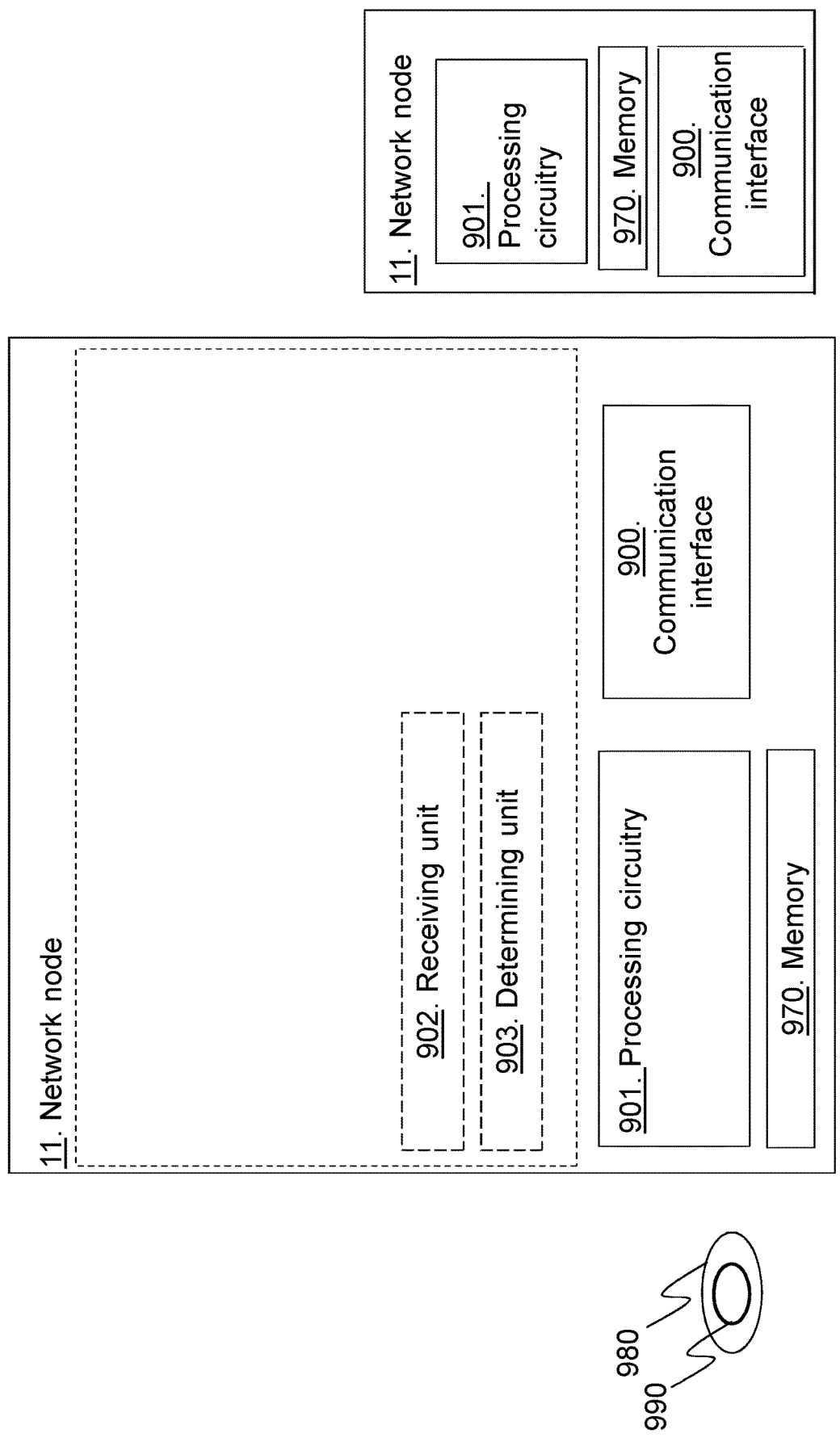
FIG. 9 is a block diagram depicting a network node according to embodiments herein.

To perform the method actions mentioned above for identifying the equipment, the network node 11 may comprise an arrangement depicted in two embodiments in FIG. 9.

The network node 11 may comprise a communication interface 900 depicted in FIG. 9, configured to communicate e.g. with the communications network 100 also referred to as a cloud network. The communication interface 900 may comprise a wireless receiver (not shown) and a wireless transmitter (not shown) and e.g. one or more antennas. The embodiments herein may be implemented through a processing circuitry 901 configured to perform the methods herein. The processing circuitry may comprise one or more processors. Thus, it is herein provided a mobile device comprising processing circuitry and memory, said memory comprising instructions executable by said processing circuitry whereby said network node 11 is operative to perform the methods herein.

The network node 11 may comprise a receiving unit 902, a receiver or a transceiver. The processing circuitry 901, the network node 11 and/or the receiving unit 902 is configured to receive from one or more mobile devices, one or more radiation indications associated with the recorded image of the equipment, which image is recorded in the recording direction at the first location. The one or more radiation indications may comprise one or more measured signal strengths, signal qualities, and/or frequencies of one or more beams or signals from the equipment. The processing circuitry 901, the network node 11 and/or the receiving unit 902 may be configured to select one measured signal strength, signal quality, and/or frequency out of the one or more measured signal strengths, signal qualities, and/or frequencies based on level measured signal strengths, and/or signal qualities. The processing circuitry 901, the network node 11 and/or the receiving unit 902 may be configured to receive another radiation indication from another device.

The network node 11 may comprise a determining unit 903, e.g. a processor. The processing circuitry 901, the network node 11 and/or the determining unit 903 is configured to determine the direction of radiation from the equipment by analysing the received one or more radiation indications. The analysing the received one or more radiation indications may comprise determining a maximum measured signal strength and/or signal quality, and/or determining angle of arrival and/or a frequency of one or more beams or signals from the equipment, and the processing circuitry 901, the network node 11 and/or the determining unit 903 may then be configured to determine configured to determine the direction of radiation based on the determined maximum measured signal strength and/or signal quality, angle of arrival and/or frequency. The processing circuitry 901, the network node 11 and/or the determining unit 903 is configured determine the identity of the equipment based on the recorded image and the determined direction of radiation from the equipment. Image processing may be used to determine the identity of the equipment. The processing circuitry 901, the network node 11 and/or the determining unit 903 may be configured to identify the additional equipment connected to the identified equipment by tracking, using image processing, the cable connected to the identified equipment in the recorded image. The processing circuitry 901, the network node 11 and/or the determining unit 903 may be configured to identify the vendor, the operator and/or the owner of the equipment and/or the additional equipment based on the determined identity of the equipment.

The embodiments herein may be implemented through a respective processor or one or more processors, such as a processor of the processing circuitry 901 in the network node 11 depicted in FIG. 9, together with a respective computer program code for performing the functions and actions of the embodiments herein. The program code mentioned above may also be provided as a computer program product, for instance in the form of a data carrier carrying computer program code for performing the embodiments herein when being loaded into the network node 11. One such carrier may be in the form of a universal serial bus (USB) stick, a disc or similar. It is however feasible with other data carriers such as any memory stick. The computer program code may furthermore be provided as pure program code on a server and downloaded to the network node 11.

The network node 11 may further comprise a memory 970 comprising one or more memory units to store data on. The memory comprises instructions executable by the processor. The memory 970 is arranged to be used to store e.g. measurements, photos, location information, meta data, instructions, configurations and applications to perform the methods herein when being executed in the network node 11.

Those skilled in the art will also appreciate that the units in the network node 11 mentioned above may refer to a combination of analogue and digital circuits, and/or one or more processors configured with software and/or firmware, e.g. stored in the network node 11, that when executed by the respective one or more processors perform the methods described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 990 comprises instructions, which when executed by the respective at least one processor, cause the at least one processor of the network node 11 to perform the actions above.

In some embodiments, a carrier 980 comprises the computer program 990, wherein the carrier 980 is one of an electronic signal, an optical signal, an electromagnetic signal, a magnetic signal, an electric signal, a radio signal, a microwave signal, or a computer-readable storage medium.

When using the word "comprise" or "comprising" it shall be interpreted as non-limiting, i.e. meaning "consist at least of".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a mobile device for handling identification of equipment, the method comprising:
   recording an image, in a recording direction at a first location, of the equipment;
   upon recording the image, obtaining one or more radiation indications for determining a direction of radiation from the equipment, the one or more radiation indications comprising signal qualities and frequencies of one or more beams or signals from the equipment;
   providing the obtained one or more radiation indications associated with the recorded image, to an internal identifying process at one or both of the mobile device and a network node for identifying the equipment, the internal identifying process comprising:
      generating a radio energy signature map based on the obtained one or more radiation indications and the recorded image, the radio energy signature map comprising energy measurements determined at different points around the equipment;
      determining the direction of radiation from the equipment by analyzing the obtained one or more radiation indications; and
      determining an identity of the equipment using image processing, the image processing being performed by using machine learning on the generated radio energy signature map and the determined direction of radiation from the equipment.

2. The method according to claim 1, wherein the one or more radiation indications further comprise measured signal strengths.

3. The method according to claim 1, wherein obtaining the one or more radiation indications comprises receiving the one or more radiation indications from another device.

4. A method performed by a network node for identifying an equipment, the method comprising:
   receiving from one or more mobile devices, one or more radiation indications associated with a recorded image of the equipment, which image is recorded in a recording direction at a first location, the one or more radiation indications comprising signal qualities and frequencies of one or more beams or signals from the equipment;
   determining a direction of radiation from the equipment by analysing the received one or more radiation indications; and
   determining an identity of the equipment based on the recorded image and the determined direction of radiation from the equipment, the determining of the identity of the equipment comprising:
      generating a radio energy signature map based on the received one or more radiation indications and the recorded image, the radio energy signature map comprising energy measurements determined at different points around the equipment;
      determining the direction of radiation from the equipment by analyzing the received one or more radiation indications; and
      determining an identity of the equipment using image processing, the image processing being performed by using machine learning on the generated radio energy signature map and the determined direction of radiation from the equipment.

5. A mobile device for handling identification of equipment, wherein the mobile device is configured to:
   record an image, in a recording direction at a first location, of the equipment;

upon recording the image, obtain one or more radiation indications for determining a direction of radiation from the equipment, the one or more radiation indications comprising signal qualities and frequencies of one or more beams or signals from the equipment;

provide the obtained one or more radiation indications associated with the recorded image, to an internal identifying process at one or both of the mobile device and a network node for identifying the equipment, the internal identifying process comprising:

generating a radio energy signature map based on the obtained one or more radiation indications and the recorded image, the radio energy signature map comprising energy measurements determined at different points around the equipment;

determining the direction of radiation from the equipment by analyzing the obtained one or more radiation indications; and determining an identity of the equipment using image processing, the image processing being performed by using machine learning on the generated radio energy signature map and the determined direction of radiation from the equipment.

6. The mobile device according to claim 5, wherein the one or more radiation indications further comprise measured signal strengths.

7. The mobile device according to claim 5, wherein the mobile device is configured to obtain the one or more radiation indications by receiving the one or more radiation indications from another device.

8. The mobile device according to claim 5, wherein the mobile device is further configured to identify an additional equipment connected to the identified equipment by tracking, using image processing, a cable connected to the identified equipment in the recorded image.

9. The mobile device according to claim 5, wherein the mobile device is further configured to:

identify at least one of a vendor, an operator, a manufacturer and an owner of the at least one of the equipment and the additional equipment based on the determined identity of the equipment.

10. The mobile device according to claim 5, wherein analysing the obtained one or more radiation indications comprises at least one of:

determining at least one of a maximum measured signal strength and the signal quality;

determining at least one of angle of arrival and the frequency of one or more beams or signals from the equipment; and determining the direction of radiation based on the at least one of the determined maximum measured signal strength and the signal quality, the angle of arrival, and the frequency.

11. A network node for identifying an equipment, the network node comprising processing circuitry, the processing circuitry is configured to:

receive from one or more mobile devices, one or more radiation indications associated with a recorded image of the equipment, which image is recorded in a recording direction at a first location, the one or more radiation indications comprising signal qualities and frequencies of one or more beams or signals from the equipment;

determine a direction of radiation from the equipment by analysing the received one or more radiation indications; and determine an identity of the equipment based on the recorded image and the determined direction of radiation from the equipment, the determining of the identity of the equipment comprising:

generating a radio energy signature map based on the received one or more radiation indications and the recorded image, the radio energy signature map comprising energy measurements determined at different points around the equipment;

determining the direction of radiation from the equipment by analyzing the received one or more radiation indications; and determining an identity of the equipment using image processing, the image processing being performed by using machine learning on the generated radio energy signature map and the determined direction of radiation from the equipment.

12. The network node according to claim 11, wherein the network node is further configured to:

identify an additional equipment connected to the identified equipment by tracking, using image processing, a cable connected to the identified equipment in the recorded image.

13. The network node according to claim 11, wherein the network node is further configured to:

identify at least one of a vendor, an operator and an owner of at least one of the equipment the additional equipment based on the determined identity of the equipment.

14. The network node according to claim 11, wherein the one or more radiation indications further comprise measured signal strengths.

15. The network node according to claim 11, wherein the network node is further configured to receive another radiation indication from another device.

16. The network node according to claim 11, wherein analysing the received one or more radiation indications comprises at least one of:

determining at least one of a maximum measured signal strength and the signal quality;

determining at least one of angle of arrival and the frequency of one or more beams or signals from the equipment; and determining the direction of radiation based on the at least one of the determined maximum measured signal strength and the signal quality, the angle of arrival, and the frequency.

\* \* \* \* \*